June 29, 1937. H. E. TAUTZ 2,085,236
WORKHOLDER FOR SAWS
Filed Feb. 19, 1936 3 Sheets-Sheet 1

WITNESSES
L. E. Kilian
C. L. Naal

INVENTOR
Herbert E. Tautz
By R. S. C. Caldwell
ATTORNEY

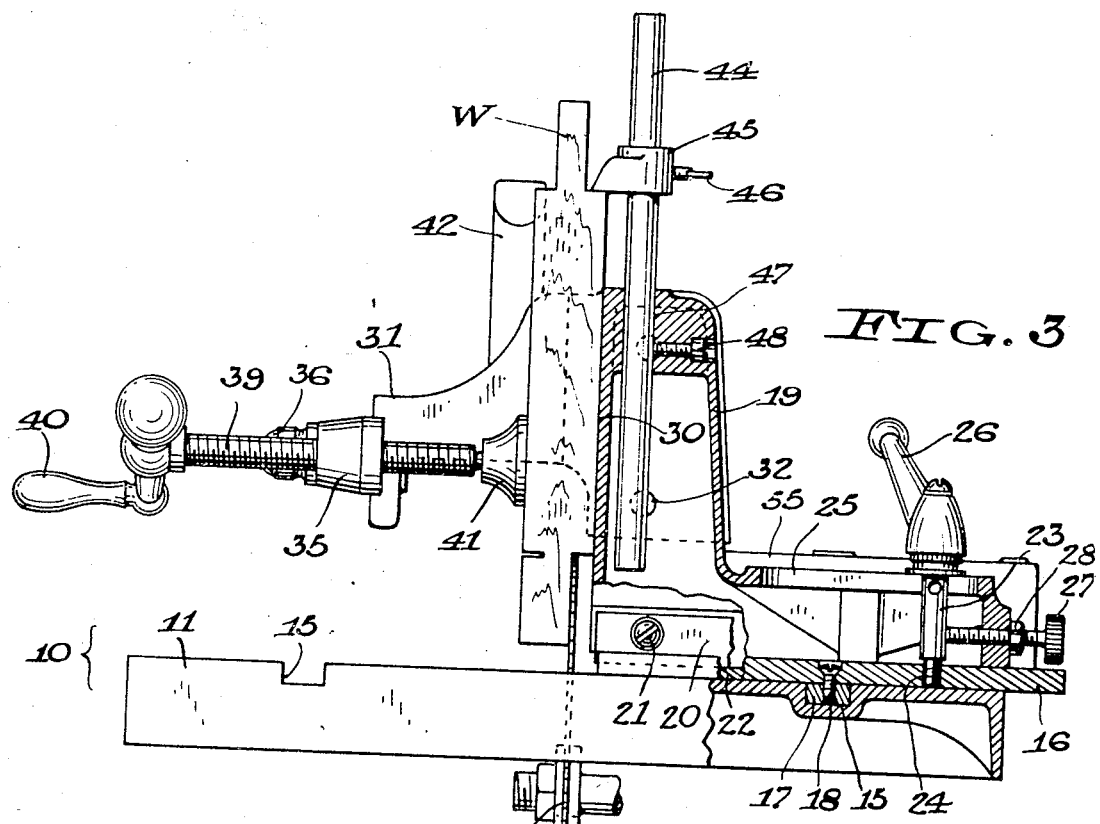
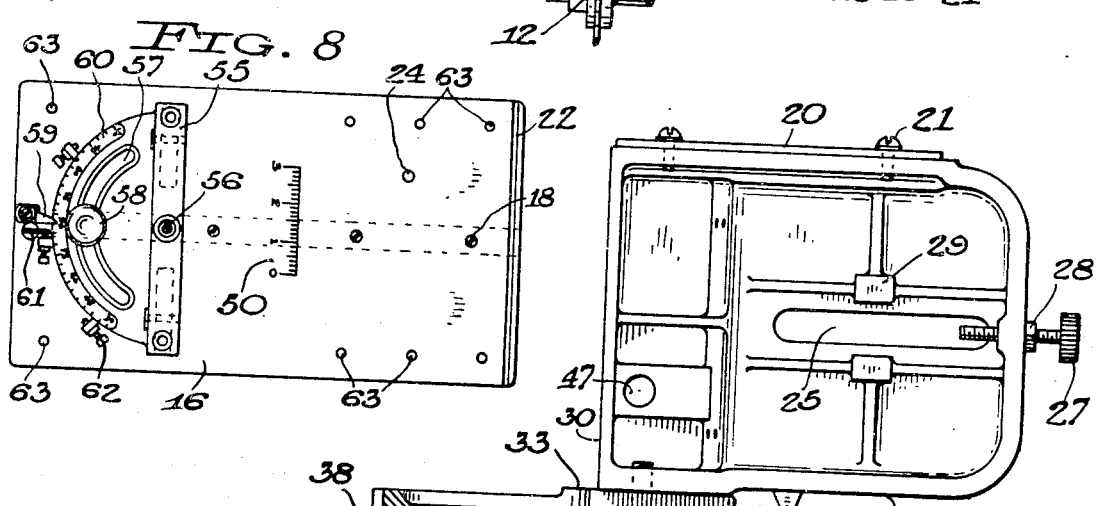

June 29, 1937.   H. E. TAUTZ   2,085,236
WORKHOLDER FOR SAWS
Filed Feb. 19, 1936   3 Sheets-Sheet 3
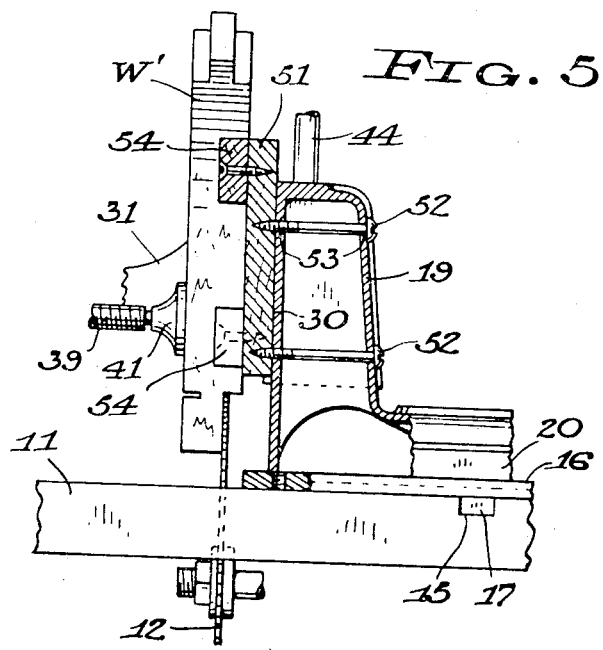
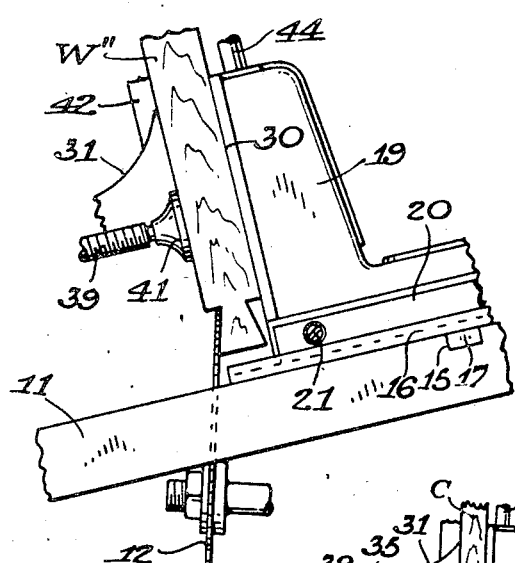
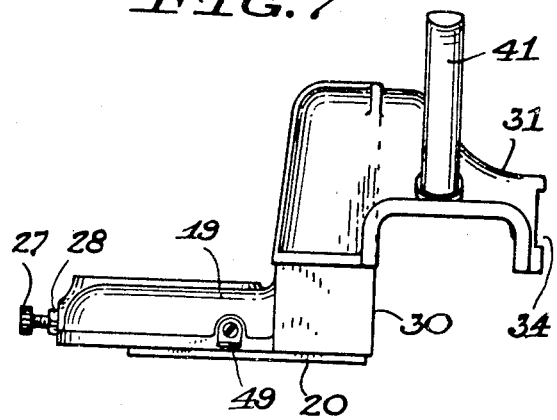
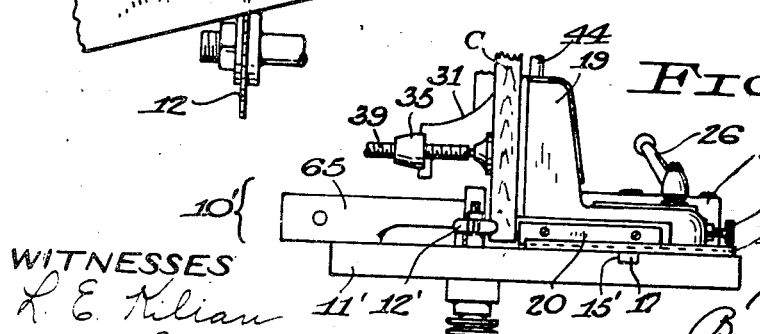
WITNESSES
L. E. Kilian
C. L. Naal
INVENTOR
Herbert E. Tautz
By R. S. Caldwell
ATTORNEY Patented June 29, 1937

2,085,236

UNITED STATES PATENT OFFICE 2,085,236

WORKHOLDER FOR SAWS

Herbert E. Tautz, Milwaukee, Wis., assignor to The Delta Manufacturing Company, Milwaukee, Wis., a corporation of Wisconsin Application February 19, 1936, Serial No. 64,611

9 Claims. (Cl. 143—168)

The invention relates to work holders for saws, shapers, and other machine tools.

The ordinary circular saw has been used to some extent, especially in small shops, for cutting tenons and for making dado cuts in end grain, although such practice is attended with considerable danger to the operator. The customary saw guard cannot be used in such operations because of the position of the work, and there is the possibility that the operator's hand may be drawn against the saw blade by a deflected work-piece. A further disadvantage is that slipping of the work will cause inaccurate cutting and damage to the work. The use of a rotary shaper for cutting a work-piece at or near its end and across the grain has also been open to similar objections.

It is an object of the present invention to provide a work holder of simple, durable, and inexpensive construction for use on circular saws and other machines to enable tenoning, shaping, and other cutting operations to be safely, accurately, and quickly performed, even by inexperienced operators.

Another object of the invention is to provide a work holder which will accommodate work-pieces of different size, and which will facilitate repetition cutting.

The invention further consists in the several features hereinafter described and claimed.

In the accompanying drawings, illustrating certain embodiments of the invention, Fig. 1 is a top plan view of a work holder constructed in accordance with the invention applied to a circular saw machine;

Fig. 3 is an end elevation of the work holder and machine, parts being broken away and parts being shown in section;

Fig. 4 is a bottom view of parts of the work holder;

Fig. 5 is another elevation of the work holder and machine, and showing another form of work mounting, parts being broken away and parts being shown in section;

Fig. 6 is a further elevation of the work holder and machine, as set up for cutting a dovetail;

Fig. 7 is an end elevation of certain parts of the work holder;

Fig. 8 is a top plan view of a sliding base plate, and

Fig. 9 is an end elevation of the work holder applied to a spindle shaper.

Figure 1:
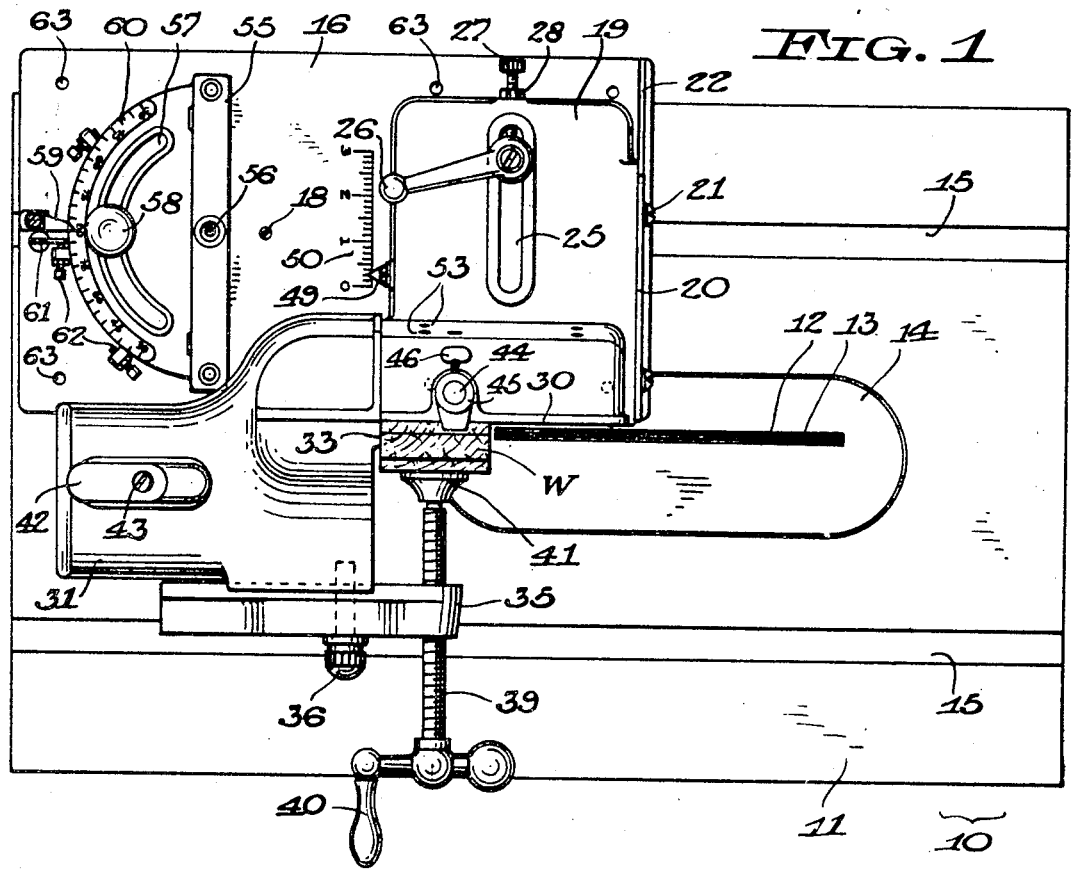
Figure 2:
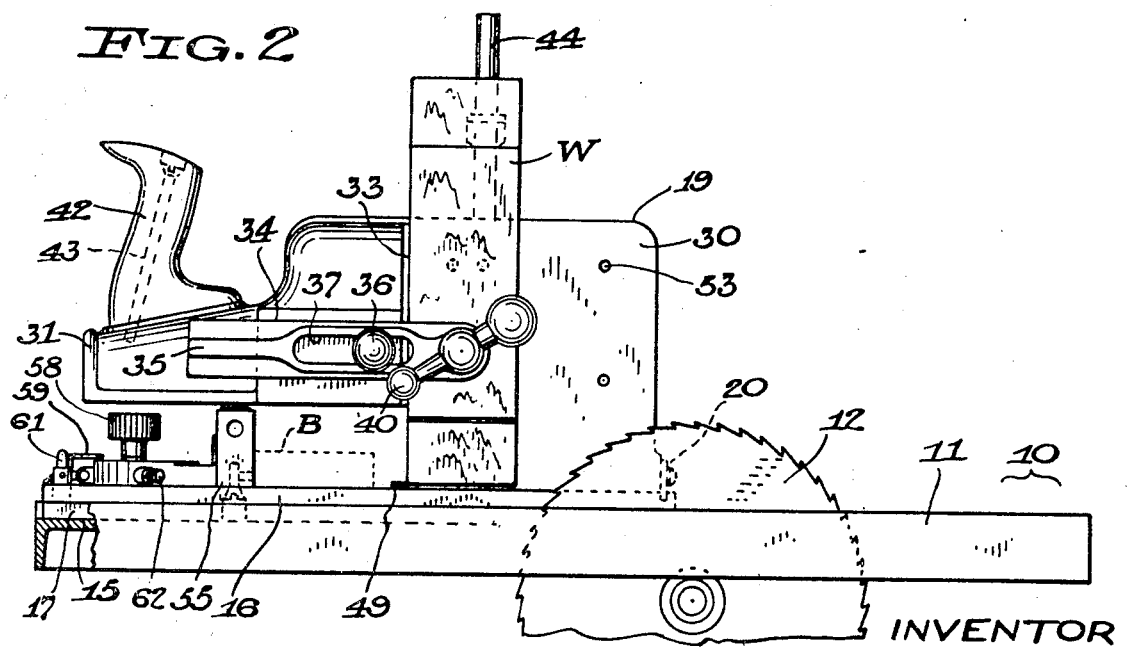
Fig. 2 is a side elevation of the work holder and machine, parts being broken away and parts being shown in section.

In that form of the invention shown in Figs. 1 to 8, 10 designates a wood-working machine having a table 11 and a cutter 12. The machine is here exemplified by a circular saw machine, the saw blade 12 thereof projecting through a slot 13 in a removable table insert 14. The table is provided with a guideway extending parallel to the plane of the saw blade and preferably in the form of one of the usual guide grooves 15 in the table top. The circular saw machine may be of any suitable construction, such as that shown in my United States Letters Patent No. 1,910,651 for Trunnion table mounting, issued May 23, 1933.

A flat rectangular metal base plate 16 slidably rests on the table top, and a guide bar or key 17 is secured, as by screws 18, to the bottom face of the base plate. The guide bar 17 slidably fits in one of the guide grooves 15 of the table, so as to confine the base plate in a longitudinal path of travel parallel to the plane of the saw blade 12. One side edge of the base plate is adjacent the plane of the saw blade.

A hollow L-shaped bracket 19 slidably rests on the base plate 16 and is movable thereon in a lateral direction perpendicular to the longitudinal path of travel of the base plate, the bracket being guided in its lateral movement by a guide bar or key 20 secured thereto by screws 21 and slidably fitting in a transversely extending guideway or groove 22 formed in the top face of the base plate near the rear edge of the plate. The bracket 19 is clamped in adjusted position on the base plate by an upright stud 23 removably screw-threaded into an opening 24 in the base plate (Fig. 3) and extending through a slot 25 formed in the horizontal foot portion of the bracket, the upper end of the stud being rigidly secured to a handle 26. A thumb-screw 27 is threaded into the bracket 19 to laterally engage the stud 23, and serves not only to limit the travel of the bracket toward the saw blade so that the bracket will not strike the saw blade, but also to effect fine adjustment of the bracket with respect to the saw blade. The thumb-screw 27 is held in adjusted position by a lock nut 28. The hollow bracket 19 is internally ribbed for rigidity, and has a machined flat bottom surface engaging the base plate, the bearing surface including bearing pads 29 (Fig. 4) near the slot 25 to resist clamping pressure exerted by the stud 23.

The upstanding portion of the L-shaped bracket 19 has a machined flat work-positioning face 30 which is perpendicular to the table top and parallel to the direction of travel of the base plate. A guard member or housing 31 is spaced above the table and is rigidly secured to the bracket 19, as by means of screws 32 (Figs. 3 and 4), the guard member forming an extension of the bracket. The guard member 31 has a machined flat work-positioning face 33 perpendicular to the bracket face 30 and to the table top. A side face of the guard member is provided with a horizontally extending channel 34 in which slidably fits a clamping arm 35, the arm being adjustably secured to the guard member by a thumb-screw 36 passing through a slot 37 in the arm and into a threaded bore 38 (Fig. 4) formed in the guard member. The arm 35 has screw-threaded therethrough a clamping screw 39 extending perpendicular to the clamping face 30 of the bracket 19. The screw 39 is provided with a crank-handle 40 at its outer end and with a swiveled clamping head or button 41 at the other end. A work-piece W to be tenoned is placed against the machined positioning faces 30 and 33 and is clamped in position by the swiveled head 41 of the clamping screw 39. The portion of the guard member 31 which is movable over the saw is of inverted U-shape or channel-shape, as best seen in Fig. 7. A plane handle 42 is secured to the guard member 30, as by a screw 43, to facilitate the movement of the carrier formed by the base plate 16 and the parts mounted thereon. The work-piece W is positioned in a vertical direction by an upright gage rod 44 adjustably secured to the bracket 19 and having thereon a work-engaging stop member 45 clamped in position by a thumb-screw 46. The gage rod slidably passes through a bore 47 in the bracket and is clamped thereto by a socket-head set-screw 48. The stop member is here shown to engage a shoulder formed by one of the tenons on the work-piece.

The laterally adjustable bracket 19 is provided with a pointer 49 which cooperates with a scale 50 on the base plate 16 to indicate the position of the bracket with respect to the base plate and to the saw.

For special work-pieces, such as the curved work-piece W', shown in Fig. 5, the work-positioning face 33 on the guard member 31 cannot ordinarily be used and it is then desirable to employ an auxiliary positioning device to suit the work at hand. This device is here shown to consist of a flat plate 51 of wood or other material secured to the vertical face 30 of the bracket by screws 52 passing through bores 53 in the upright position of the bracket 19, there being blocks or shoulders 54 on the plate 51 to position the work-piece.

When a work-piece W" is to be dovetailed, the apparatus is set up as shown in Fig. 6, the table being tilted to a suitable inclination. Obviously, the same result could be obtained by tilting the saw with respect to the table.

The base plate 16 is preferably provided near its front portion with a miter gage head 55 which is swingably secured to the base plate by a pivot screw 56 and has an arcuate slot 57 concentric with the pivot screw and receiving therethrough a clamping thumb-screw 58. A pointer 59 on the base plate cooperates with an angular scale 60 on the miter gage head, and a swingable L-shaped stop member 61 on the base plate cooperates with a number of adjustable stop screws 62 on the head for facilitating the positioning of the head to different angular positions. The miter gage may be similar to that shown in my United States Letters Patent No. 1,894,010 for Work holding means for gauges, issued January 10, 1933.

The sliding base plate 16 is adapted to support a work-piece B thereon (Fig. 2), the work-piece being positioned by the miter gage head 52 and being brought against the saw 12 by the advancing travel of the base plate. In some cases, the work-pieces W and B may be cut in the same operation as the base plate is advanced in its travel, while in other cases these work-pieces may be cut in separate operations. In still other cases the bracket 19 may be removed from the base plate to permit the sliding base plate to support wide boards.

The base plate 16 is provided with a number of tapped holes 63 near its opposite side edges to receive suitable work-clamping means, such as disclosed in my companion application for Work holders for shapers, Serial No. 64,610, filed February 19, 1936, and when such work-clamping means are employed the bracket 19 is ordinarily removed from the base plate.

For some classes of work, the circular saw may be replaced by a suitable shaping cutter head, such as that shown in my United States Letters Patent No. 1,830,813 for Cutter head, issued November 10, 1931. For cutting various materials other than wood, the saw may be replaced by a suitable abrasive cutting wheel or disk.

In Fig. 9, the work holder is shown applied to a spindle shaper 10' having a table 11' through which projects a rotary shaping cutter 12'. The base plate 16 of the work holder slidably rests on the table 11', the key 17 of the base plate slidably fitting in a guideway or groove 15' formed in the table top. A work-piece C is clamped on the work holder and is fed past the rotary shaping cutter 12' by moving the work holder along the table. A cutter-guarding fence 65 of any suitable construction may remain on the table during the cutting operation, but may or may not be used to determine the depth of cut, as desired.

In setting up the apparatus for tenoning, the base plate 16 is mounted on the saw table 11 to slide thereon, and the bracket 19 is placed on the base plate, the key 20 thereof being entered into the guide groove 22, and the clamping stud 23 being threaded into the base plate, although not sufficiently tight to prevent sliding of the bracket. The work-piece W, with its side faces transversely cut, is then clamped to bracket 19 by the screw 39, the arm 35 being adjusted to bring the clamping button 41 about midway between the side edges of the work-piece. The thumb-screw 27 is adjusted to laterally position the work-piece with respect to the plane of the saw, and the bracket 19 is then clamped in position by the handle 26. The saw (or table) is raised or lowered to obtain the desired depth of cut.

In operation, the saw is driven from any suitable source of power, not shown, and the operator grasps the handle 42 and pushes the work holder along the table to bring the clamped work-piece against the saw, thus severing a rectangular block from the work-piece. The work holder is then retracted, and the work-piece is released and reclamped after turning it side for side, following which the work-piece is again presented to the saw to complete the tenon at one end of the work-piece. The work-piece is then turned end for end and reclamped to the work holder to cut the other tenon in a similar manner. The stop member 45 is used to vertically position the work-piece. If desired, the work-pieces W and B may be cut in the same stroke or advance of the carrier, as hereinbefore noted.

When dovetail tenons are to be cut the same procedure is followed, except that the table is relatively inclined with respect to the saw, as indicated in Fig. 6.

When the curved work-piece W' of Fig. 5 is to be tenoned, it is clamped to the auxiliary positioning plate 51 on the bracket 19, as hereinbefore described.

By means of the work holder of the invention, tenoning, dado cutting on end grain, shaping, and other cutting operations can be safely, accurately, and quickly performed. The work holder is fed toward the saw or other cutter with one hand and this hand is far removed from the cutter and need not be used to hold the work.

What I claim as new and desire to secure by Letters Patent is:

1. The combination, with a machine tool having a cutter and having a table with a guideway, of a base member slidable along said table and guided by said guideway, said base member having a transverse guideway, a work-supporting member slidable on said base member and guided by said transverse guideway, said work-supporting member having a work-positioning face at an angle to the plane of said table, means for securing said work-supporting member to said base member, and means for pressing and clamping a work-piece against said work-positioning face at an adjustable elevation with respect to the table to present said work-piece to said cutter by the travel of said base member along said table guideway.

2. The combination, with a machine tool having a cutter and having a table with a guideway, of a work holder slidable along said table and guided by said guideway and having a work-positioning surface and an extending guard portion movable over said cutter during the travel of said work holder, said guard portion having a downwardly facing channel-like guard passage, and a clamping member carried by the outer side wall of said extending guard portion for securing a work-piece to said work-positioning face.

3. The combination, with a machine tool having a cutter and having a table with a guideway, of a work holder slidable along said table and guided by said guideway and having a work-positioning surface and an extending guard portion movable over said cutter during the travel of said work holder, an arm adjustably secured to said extending guard portion, and a clamping screw mounted on said arm for securing a work-piece to said work-positioning face.

4. The combination, with a machine tool having a cutter and having a table with a guideway, of a work holder slidable along said table and guided by said guideway and having a work-positioning face at an angle to the plane of said table, means for pressing and clamping a work-piece to said face and at an adjustable elevation above the table, and a gage member projecting upwardly from said work holder for engaging the work-piece to limit the upward sliding movement of the work-piece on said face.

5. The combination, with a machine tool having a cutter and having a table with a guideway, of a base member slidable along said table and guided by said guideway, said base member having a transverse guideway, a work-supporting member slidable on said base member and guided by said transverse guideway, said work-supporting member having a work-positioning face, means for securing said work-supporting member to said base member, means for clamping a work-piece to said work-positioning face to present said work-piece to said cutter by the travel of said base member, and a stop screw for adjusting and limiting the transverse movement of said work-supporting member toward said cutter.

6. The combination, with a machine tool having a cutter and having a table with a guideway, of a base member slidable along said table and guided by said guideway, said base member having a transverse guideway, an L-shaped bracket having its foot portion slidable on said base member and guided by said transverse guideway, means for securing said bracket to said base member, the upstanding portion of said bracket having a work-positioning face, and means pressing and clamping a work-piece against said face.

7. The combination, with a machine tool having a cutter and having a table with a guideway, of a base member slidable along said table and guided by said guideway, said base member having a transverse guideway, a work-supporting member slidable on said base member and guided by said transverse guideway, said work-supporting member having a work-positioning face and having a slot extending parallel to said transverse guideway, a clamping member extending through said slot for clamping said work-supporting member to said base member, and a screw adjustably mounted in said work-supporting member for laterally engaging said clamping member to determine the position of said work-supporting member on said base member.

8. The combination, with a circular saw-machine having a rotary saw blade and having a table with a guide groove extending parallel to the plane of said saw blade, of a base plate slidable along said table and having a downwardly projecting part guided by said guide groove, said base plate having a transverse guide groove and having a side edge adjacent the plane of the saw blade, a work-supporting member slidable on said base member and guided by said transverse guide groove, said work-supporting member having a pair of work-positioning faces perpendicular to each other and to the table, one of said faces extending parallel to the direction of travel of said base plate, said faces being adapted to receive thereagainst an upstanding work-piece, and means for clamping the work-piece against at least one of said surfaces to present the under side of said work-piece to the saw by the travel of the base plate.

9. The combination, with a circular-saw machine having a rotary saw blade and having a table with a guide groove extending parallel to the plane of said saw blade, of a tenoning attachment for said machine comprising a base plate slidable along said table and guided by said guide groove, said base plate having a transverse guideway, a work-supporting member slidable on said base plate and guided by said transverse guideway, said work-supporting member having a flat work-positioning face perpendicular to the table and extending parallel to the direction of travel of the base plate, said work-positioning face being adapted to receive a work-piece thereagainst, and means for clamping the work-piece against said face to present the under side of the work-piece to the saw blade by the travel of the base plate.

HERBERT E. TAUTZ.